Feb. 13, 1968     M. L. CRIPE     3,368,350
FLUID PRESSURE PROPORTIONING MEANS
Filed May 16, 1966
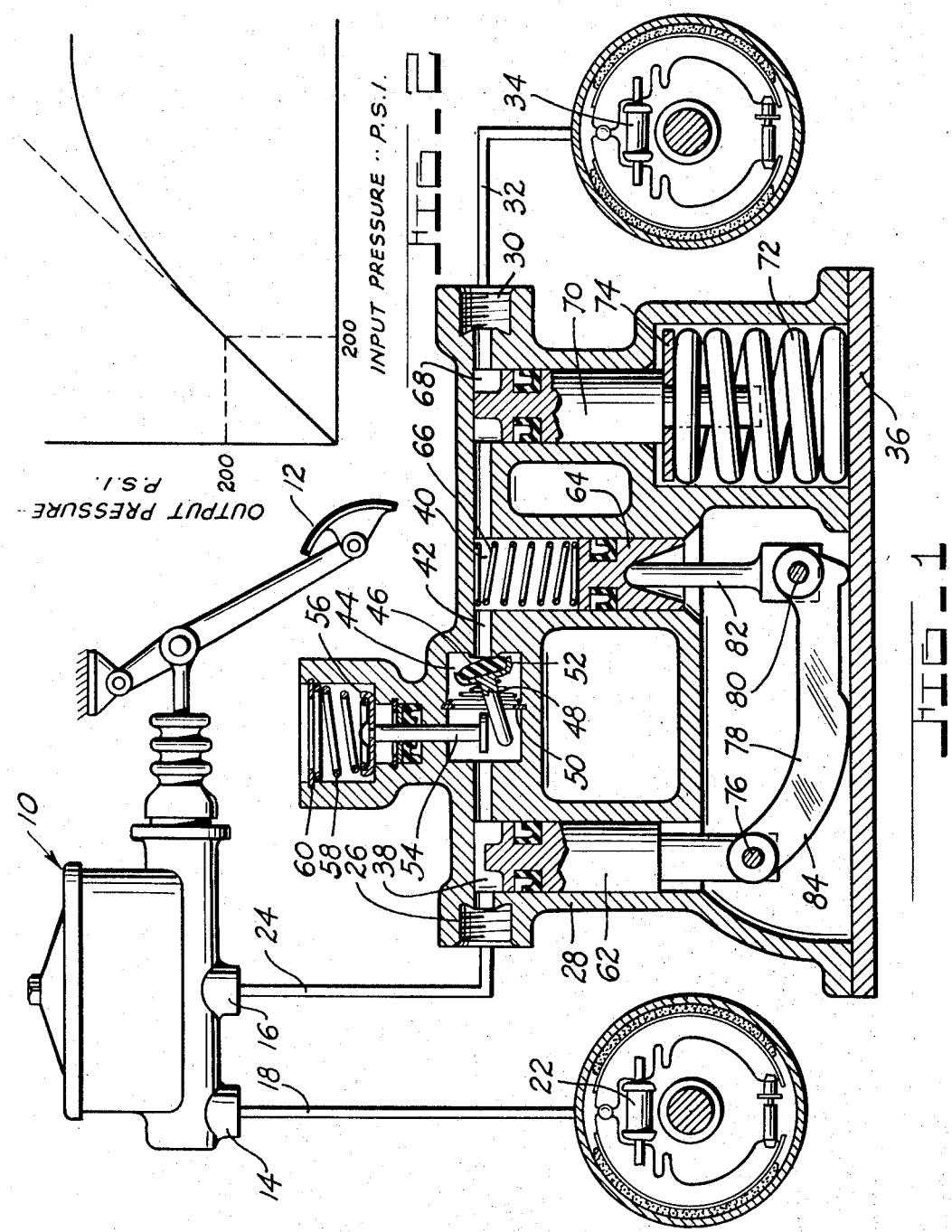
INVENTOR.
MAXWELL L. CRIPE.
BY
*Richard G. Geib*
ATTORNEY.

United States Patent Office 3,368,350
Patented Feb. 13, 1968

3,368,350
FLUID PRESSURE PROPORTIONING MEANS
Maxwell L. Cripe, South Bend, Ind., assignor to The Bendix Corporation, a corporation of Delaware
Filed May 16, 1966, Ser. No. 550,302
7 Claims. (Cl. 60—54.5)

This invention relates to a means for decreasing operating pressure for a motor with respect to a pressure generated by an actuator.

It is a principal object of this invention to provide a proportioning unit having a means to receive a pressure from an actuator and, up to a predetermined pressure, supply an equal output pressure with respect to input pressure and thereafter vary a delivery of an output pressure in proportion to the level of input pressure.

It is a still further object of this invention to provide a means for a linear relationship of output pressure to input pressure that changes into a curvilinear relationship above a predetermined pressure value.

A still further object of this invention is to provide a pressure proportioning unit having means for maintaining a maximum output pressure.

Other objects and advantages of this invention will appear from the following description of the drawings in which:

FIGURE 1 shows a brake proportioning system embodying a fluid proportioning unit in cross section in accordance with the principles of my invention; and FIGURE 2 shows a graphical illustration of the expected pressure output of a braking system in accordance with the construction of FIGURE 1.

With reference to FIGURE 1, there is shown a master cylinder 10 that is operated by a brake pedal 12 to develop independent fluid pressures for a pair of master cylinder outlets 14 and 16. As seen, the outlet 14 is connected by means of a conduit 18 to a front braking wheel cylinder 22; whereas the outlet 16 is connected to a conduit 24 leading to an inlet 26 of a body portion 28 of a fluid pressure proportioning unit in accordance with the principles of my invention. The body portion 28 is provided with an outlet 30 to which a conduit 32 is mated that leads to a wheel cylinder 34 of the rear brake for an associated vehicle also mounting the front brake.

The brake proportioning unit is essentially formed by the body portion 28 that is open at its lowermost end for the assembly of parts therewithin that is, after such assembly, closed by means of a cover plate 36. Within the body portion there is provided an inlet chamber 38 and a chamber 40, both of which are connected to a fluid conduit 42. As seen, the fluid conduit 42 is open as at 44 to provide a valve chamber in which a poppet 46 is connected by a spring 48 to a snap ring 50 in the body portion 28. The poppet 46 is arranged to cooperate with a valve seat 52 formed about the fluid conduit 42 between the chambers 38 and 40. A pressure responsive plunger 54 is reciprocally mounted through an opening in the body portion 28 to extend into the valve chamber 44. At its uppermost end, as seen in FIGURE 1, the plunger 54 is connected to a spring bearing plate 56 which is in turn connected by a spring 58 to a snap ring 60 inserted within a groove of the body portion 28.

Within the chamber 38 a piston or wall 62 is reciprocally arranged, and within the chamber 40 another similar type piston 64 is reciprocally arranged with a return spring 66 biasing the piston 64 downwardly in the chamber 40.

A still further chamber 68 is provided in the body portion 28 adjacent the outlet 30 in which a further piston 70 is reciprocally arranged so as to be biased upwardly in the chamber 68 by a spring 72. The spring 72 is compressed between the cover plate 36 and a spring bearing plate 74 connected to the piston 70.

In operation, and considering a utilization in a passenger car, the operator of a vehicle depresses a brake pedal 12 to generate a pressure for the wheel cylinders 22 and another pressure that is directed to the inlet 26 of the proportioning unit body portion 28. Until the pressure from the master cylinder 10 reaches approximately 200 p.s.i., the poppet 46 will remain as seen in FIGURE 1. Above this pressure, the plunger 54 will be moved outwardly of the valve chamber 54 to permit the seating of the poppet 46 on the seat 52. Thereafter pressure will develop in chamber 38 forcing the piston 62 downwardly. As the piston 62 moves downwardly, and due to the pin connection 76 with a lever 78 that is connected by means of a pin 80 to a push rod 82 that is in turn connected to the piston 64, it will cause the piston 64 to move upwardly in the chamber 40 to develop pressure for the outlet port 30. The lever is provided with a cam surface 84 whose fulcrum point will vary as the piston 62 moves downwardly so that increased pressure in the chamber 38 is required to pressurize the fluid in the chamber 40.

At a certain maximum pressure, i.e., a pressure greater than the rate of the spring 72, the piston 70 will be moved downwardly in the chamber 68 so that displacement from the chamber 40 by the piston 64 will be provided for in chamber 68. This is especially desirable for permitting continued ratio change between input and output pressures where the expansion characteristics of the system are limited. In such a system and without the use of the spring loaded piston 70 there could be no ratio change above a certain displacement to the outlet port 30. Consequently, when using this feature, the piston 70 and the return spring 72 are designed to supplement the natural system expansion characteristics.

Thus, it will be appreciated that at the beginning the direct relationship of input to output pressure is a linear relationship. After the valve means closes, the downward movement of the piston 62 in pivoting the lever 78 will create shorter and shorter arms for transmitting upward motion to the piston 64. Thus the relationship of input pressure to output pressure now assumes a curvilinear relationship. Then upon reaching a maximum desired pressure the piston 70 will be downwardly displaced against the spring 72 so that the relationship of input to output pressure is a horizontal line in that an increase in input pressure will not provide an increase in output pressure.

All of this is seen by the graph in FIGURE 2 showing the rear brake pressure to be developed by the master cylinder 10 as a solid line and the front brake pressure as a dotted line extending beyond the point where the rear brake pressure tends to fall off due to the proportioning unit.

Having fully described the construction of the device in accordance with the principles of my invention, I wish to now set forth the scope of protection sought by these Letters Patent as follows.

I claim:
1. A fluid pressure proportioning unit comprising:
   a body portion having fluid chambers defined therein with movable wall structures;
   a fluid conduit extending between said chambers;
   a valve means in said conduit to prevent movement of fluid in said conduit in one direction with said valve means closed;
   pressure responsive means for moving said valve means to an open position to permit flow between said chambers; and
   a lever mechanism connected to said movable wall structures, said lever mechanism having a cam surface engaging said body portion such that the fulcrum point for the lever is variable in accordance with a fluid pressure on one of said movable walls after said valve means is closed whereby pressure developed by the other of said movable walls is proportionally less than developed by said one of said movable walls.

2. A fluid pressure proportioning unit in accordance with claim 1 and further comprising an inlet port for fluid pressure in said body portion and an outlet port for fluid pressure in said body portion.

3. A fluid pressure proportioning unit in accordance with claim 2 and further comprising a fluid displacement means including a chamber open to said outlet port in said body portion having a pressure responsive member operatively arranged therein.

4. A fluid pressure proportioning unit in accordance with claim 3 wherein said pressure responsive means in said chamber of said fluid displacement means includes a piston and a spring interposed between the piston and the body portion, which spring has a rate that will be matched with the expansion characteristics of a system in communication with the outlet port.

5. A fluid pressure proportioning unit in accordance with claim 4 and further including a master cylinder connected to the inlet port and a wheel cylinder for a braking system connected to the outlet port.

6. A fluid pressure proportioning unit in accordance with claim 1 wherein said valve means includes a spring biased valve arranged to cooperate with a valve seat formed on said body portion about said fluid conduit; and said pressure responsive means for operating said valve includes a plunger responsive to pressure in said fluid conduit which is biased by a spring compressed between the body portion and the plunger to open said valve whenever pressure in said fluid conduit is below a predetermined level.

7. A fluid pressure proportioning unit in accordance with claim 5 wherein said master cylinder is of a split system type supplying independent pressures to a front braking system and a rear braking system of an associated vehicle with said front braking system directly connected to said master cylinder and said rear braking system being connected to said fluid pressure proportioning unit and thence to said master cylinder.

No references cited.

MARTIN P. SCHWADRON, *Primary Examiner.*

ROBERT R. BUNEVICH, *Examiner.*